US010545295B1

(12) United States Patent
Sato

(10) Patent No.: US 10,545,295 B1
(45) Date of Patent: Jan. 28, 2020

(54) OPTICAL ADAPTER WITH SHUTTER

(71) Applicant: SANWA DENKI KOGYO CO., LTD., Tokyo (JP)

(72) Inventor: Takashi Sato, Tokyo (JP)

(73) Assignee: SANWA DENKI KOGYO CO., LTD., Tokyo (JP)

( * ) Notice: Subject to any disclaimer, the term of this patent is extended or adjusted under 35 U.S.C. 154(b) by 0 days.

(21) Appl. No.: 16/166,237

(22) Filed: Oct. 22, 2018

(51) Int. Cl.
*G02B 6/38* (2006.01)

(52) U.S. Cl.
CPC ........... *G02B 6/387* (2013.01); *G02B 6/3825* (2013.01)

(58) Field of Classification Search
CPC .............................. G02B 6/387; G02B 6/3825
USPC ............................................................ 385/75
See application file for complete search history.

(56) References Cited

U.S. PATENT DOCUMENTS

2006/0153503 A1* 7/2006 Suzuki ................. G02B 6/3807 385/53
2008/0247709 A1* 10/2008 Eguchi ................. G02B 6/3849 385/60
2011/0206325 A1* 8/2011 Hioki .................. G02B 6/3849 385/76

FOREIGN PATENT DOCUMENTS

JP 3846595 B2 11/2006

* cited by examiner

*Primary Examiner* — Jerry M Blevins
(74) *Attorney, Agent, or Firm* — Bacon & Thomas, PLLC

(57) ABSTRACT

The invention provides an optical adapter with a shutter which can shorten a total depth dimension of an adapter main body by reducing a radius of two doors in a rotating direction, and can also achieve a firm coupling of two doors to a plug insertion port side. In an optical adapter with a shutter in which an adapter main body having a plug insertion port inserted a rectangular casing-shaped optical connector plug and formed into a horizontally long rectangular opening shape is equipped with a shutter for closing a plug insertion port so as to freely open and close, and biased each other in a closing direction by an elastic member, the shutter is constructed by two doors respectively rotated inward when the shutter is pressed by an optical connector plug inserted into the plug insertion port and vertically divided into two sections so as to be arranged vertically.

15 Claims, 10 Drawing Sheets

1
1B
13
1A
3B
3A
3
4
4
2
13

1
2
1A
12A
12B
1B 1
2
1A
1B
10A
10

1
2
1A
12A
12B
12B
12A
1B 1
1B
10A
10
11A
11B
4
4
3A
3B
3
10A
10

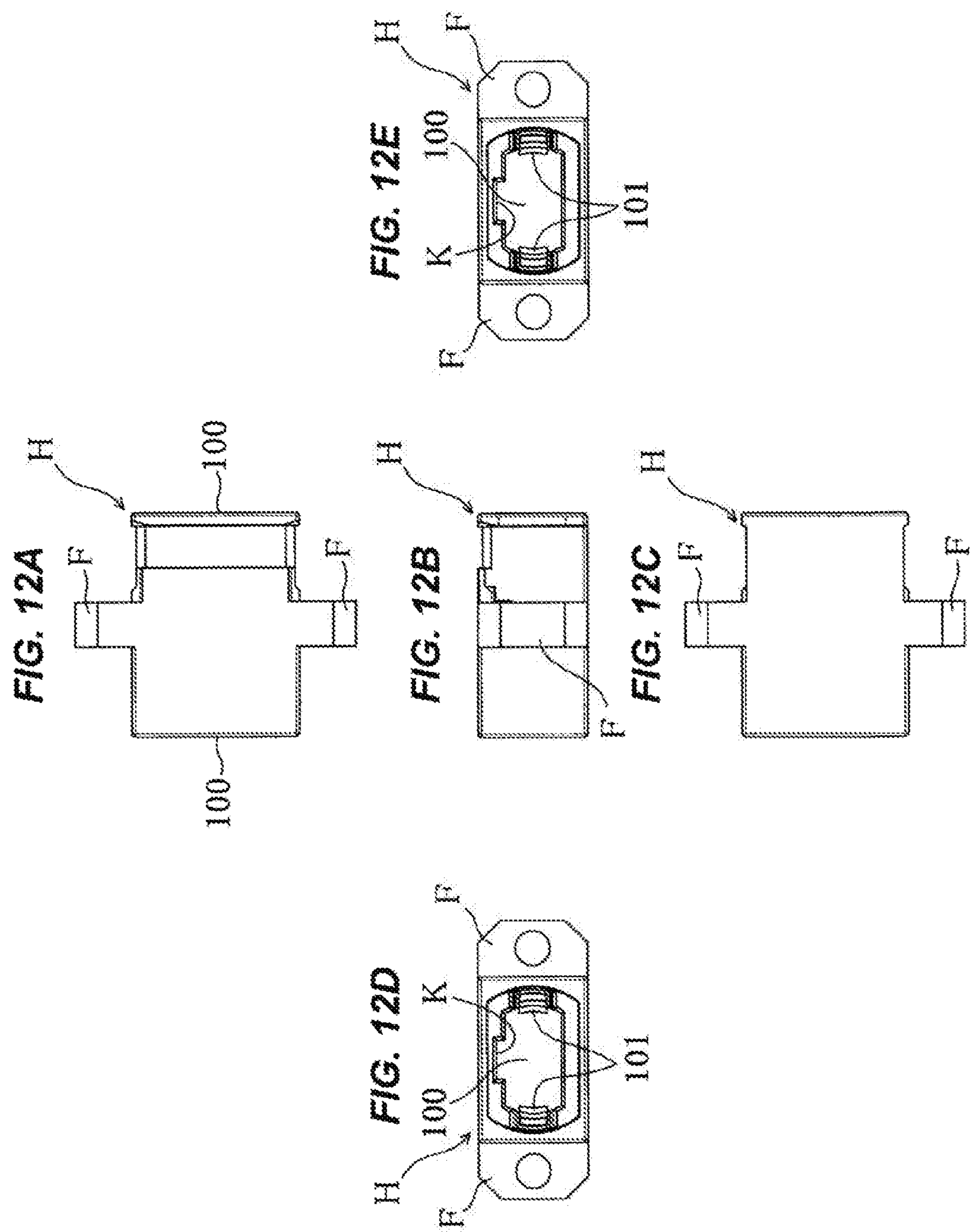

OPTICAL ADAPTER WITH SHUTTER

TECHNICAL FIELD

The present invention relates to an optical adapter with a shutter for an optical connector used for optically connecting two optical fibers while having in both ends plug insertion ports of an optical insertion port of an optical connector plug, for example of an MPO type push-pull system, and structured such that the shutter is opened by inserting the optical connector plug to one plug insertion port and the optical adapter is optically coupled to an optical fiber cable inserted into the other plug insertion port when used, and one insertion port is closed by the shutter by pulling out the optical connector plug when not used.

BACKGROUND ART

Conventionally, the adapter for the MPO type optical connector is provided with a plug insertion port 100 having a key groove K in an inner portion into which an optical connector plug (not shown) is inserted, in both ends of a horizontally long rectangular casing shaped housing H having a flange F at the center of both right and left side surfaces, and is provided with an arm-shaped locking piece 101 for retaining optical reference planes of the respective optical connector plugs inserted into both the plug insertion ports 100 at a fitting position so as to bring into line with each other in bilaterally symmetrical positions in the inner portion of the plug insertion ports 100, as shown in FIG. 11 and FIGS. 12A to 12E.

At this time, in the case that in a state in which the optical connector plug is not inserted into the one plug insertion port 100, an optical component associated with the optical connector plug connected to the other plug insertion port 100 is in an operating state, a harmful laser beam (for example, 5 mW or more) is conducted to the one plug insertion port 100, so that there has been a risk that the light may harm a worker's body seriously, particularly harm a worker's eye by a direct view of the light from the optical cable, when the worker fits the optical fiber connector to the plug insertion port 100. Further, there has been a risk that a leading end portion of the inserted optical cable (a ferrule and the optical fiber) may give a problem due to attachment of dust.

In order to avoid the risk mentioned above, there has been conventionally an optical coupling part with a shutter in which a clamshell type shutter structured such that two doors are horizontally arranged is provided, the doors rotating inside when an optical connector plug is inserted into a plug insertion port of an optical coupling part main body (an adapter main body), and these two doors of the shutter is fixed in such a manner that convex portions provided in both upper and lower ends of two doors are engaged with concave portions formed in the plug insertion port side of the optical coupling part main body by putting a mask member provided with a lock arm which can be locked to a locking groove in the optical coupling part main body (the adapter main body) side over the plug insertion port, as shown in Patent Literature 1.

CITATION LIST

Patent Literature

PATENT LITERATURE 1: Japanese Patent No. 3846595

SUMMARY OF INVENTION

Technical Problem

However, in the clamshell type shutter structured such that two doors are horizontally arranged, shown in patent literature 1 according to the conventional technique, the plug insertion port of the adapter main body is formed into a horizontally long opening shape, and the clamshell type shutter is constructed by the horizontally arranged two doors which respectively rotate inside when the shutter is pushed by the optical connector plug inserted into the plug insertion port, and are separated into two sections laterally. As a result, a radius in a rotating direction of two doors is enlarged, and there is a defect that a total depth dimension of the adapter main body is elongated.

Further, a long lock arm for locking to a locking groove in the optical coupling part main body (the adapter main body) side is formed in the mask member which is put over the plug insertion port of the adapter main body. As a result, there is a defect that a structure itself of the mask member is complicated, enlarged in size and increased in cost.

Further, the mask member put over the plug insertion port is retained only by engaging the convex portions provided in both the upper and lower ends of two doors with the convex portions of a front face side opening which is formed in the plug insertion port side of the adapter main body. As a result, there is a defect that the concave portions tend to be detached from the convex portions, and a firm coupling to the plug insertion port side of the door can not be achieved.

Consequently, the present invention is made by taking into consideration the conventionally existing various circumstances as mentioned above, and an object of the present invention is to provide an optical adapter with a shutter in which a total depth dimension of an adapter main body short can be shortened by reducing a radius of two doors in a rotating direction, a simplified, downsized and inexpensive plug insertion side cover can be formed by eliminating the conventional lock arm, a firm coupling of two doors to the plug insertion port side can be achieve, and an optical reference plane of an optical connector plug can be securely conformed.

Solution to Problem

In order to achieve the object mentioned above, according to the present invention, there is provided an optical adapter with a shutter including an adapter main body having a plug insertion port into which an optical connector plug is inserted, a shutter for closing the plug insertion port, and the shutter being installed in the adapter main body so as to freely open and close, and being biased in a closing direction by an elastic member, wherein the shutter is constructed by two doors which are separated into two upper and lower sections and vertically arranged in such a manner that the doors respectively rotate inside when the shutter is pushed by the optical connector plug inserted into the plug insertion port, the adapter main body is provided with an external housing in which right and left side wall portions are extended forward from the plug insertion port and a shaft hole is formed in each of both upper and lower ends in each of leading end portions of the right and left side wall portions, protruding shafts formed in both ends of the upper door of the shutter are pivoted to the upper shaft holes facing each other of the right and left side wall portions, and the protruding shafts formed in both the right and left ends of the lower doors of the shutter are pivoted to the lower shaft holes facing each other in the right and left side wall portions.

The upper and lower two doors of the shutter have a vertical width in which door leading ends are bonded inward to form an approximately obtuse V-shaped form when the doors rotate in a closing direction, and have in the respective leading end portions flat surface portions which are closely attached with surfaces.

The adapter main body is provided with a cover which is outward fitted to the external housing in such a manner as to cover the shutter and the right and left side wall portions from a forward side, has at right and left facing positions in a front side opening end of the cover opening edge portions for locking the upper and lower two doors rotating each other in the closing direction, and forms a depression portion having an approximately obtuse V-shaped form at the center of each of the opening edge portions.

The cover is structured such that engagement hole portions are respectively formed in an upper wall surface and a lower wall surface thereof, locking projections are respectively formed in an upper wall surface and a lower wall surface of the external housing in correspondence to the engagement hole portions, and the respective locking projections are engaged with the respective engagement hole portions when the cover is outward fitted to the external housing.

The external housing is provided with an internal holder which is fitted and inserted from a rear end side of the plug insertion port, and is formed so as to conform optical reference planes of the plug main bodies respectively inserted from both end sides of the internal holder to each other.

The internal holder is provided with a plurality of guide grooves in front ends of an outside upper wall surface and an outside lower wall surface, and locking projections are formed in front ends of an inside upper wall surface and an inside lower wall surface of the external housing in such a manner as to be fitted to a guide groove of the internal holder so as to freely engage and disengage.

A lock receiving portion is formed in rear ends of guide grooves which are formed in an outside upper wall surface and an outside lower wall surface of the internal holder, the lock receiving portion serving as a stopper portion of the internal holder in a pressing direction when fitting the locking projection in the inner portion of the external housing.

A locking projection having an approximately right triangular shape in a side view is formed ahead in a rear portion side of guide grooves which are formed in the outside upper wall surface and the outside lower wall surface of the internal holder, and a lock receiving portion is formed in a rear surface of the locking projection, the lock receiving portion serving as a stopper of the internal holder in a pulling direction when fitting the locking projection in the inner portion of the external housing.

Effect of the Invention

According to the present invention, it is possible to make a total depth dimension of the adapter main body short by reducing a radius of two doors in a rotating direction, and a large-scaled lock arm is not provided as is different from the conventional art. In this point, it is possible to form a cover in the plug insertion port side which can be more simplified, downsized and inexpensive. Further, the firm coupling of two doors to the plug insertion port side can be achieved and it is possible to securely conform the optical reference planes of the optical connector plugs.

More specifically, in the present invention, in the optical adapter with the shutter including the adapter main body having the plug insertion port into which the optical connector plug is inserted, the shutter for closing the plug insertion port, and the shutter being installed in the adapter main body so as to freely open and close, and being biased in the closing direction by the elastic member, the shutter is constructed by two doors which are separated into two upper and lower sections and vertically arranged in such a manner that the doors respectively rotate inside when the shutter is pushed by the optical connector plug inserted into the plug insertion port, the adapter main body is provided with the external housing in which the right and left side wall portions are extended forward from the plug insertion port and the shaft hole is formed in each of both upper and lower ends in each of the leading end portions of the right and left side wall portions, the protruding shafts formed in both ends of the upper door of the shutter are pivoted to the upper shaft holes facing each other of the right and left side wall portions, and the protruding shafts formed in both the right and left ends of the lower doors of the shutter are pivoted to the lower shaft holes facing each other in the right and left side wall portions. As a result, it is possible to obtain the firm coupling of two upper and lower doors in relation to the plug insertion port side.

The upper and lower two doors of the shutter have the vertical width in which the door leading ends are bonded inward to form the approximately obtuse V-shaped form when the doors rotate in the closing direction, and have in the respective leading end portions flat surface portions which are closely attached with surfaces. As a result, it is possible to prevent any junction gap between both the upper and lower doors when bonding the door leading ends to each other and any clearance caused by the distortion of the leading end portion from being generated.

The adapter main body is provided with the cover which is outward fitted to the external housing in such a manner as to cover the shutter and the right and left side wall portions from the forward side, has at the right and left facing positions in the front side opening end of the cover the opening edge portions for locking the upper and lower two doors rotating each other in the closing direction, and forms the depression portion having the approximately obtuse V-shaped form at the center of each of the opening edge portions. As a result, it is possible to widen a picking area with a tip of a finger when removing the optical connector plug from the adapter main body by the depression portion and this structure is excellent in an operability.

The cover is structured such that the engagement hole portions are respectively formed in the upper wall surface and the lower wall surface thereof, the locking projections are respectively formed in the upper wall surface and the lower wall surface of the external housing in correspondence to the engagement hole portions, and the respective locking projections are engaged with the respective engagement hole portions when the cover is outward fitted to the external housing. As a result, it is possible to simplify, downsize and cost save the locking mechanism of the cover and the adapter main body.

The external housing is provided with the internal holder which is fitted and inserted from the rear end side of the plug insertion port, and is formed so as to conform the optical reference planes of the plug main bodies respectively inserted from both end sides of the internal holder to each other. As a result, the ferrules of the optical connector plugs fitted from both end opening portions of the internal holder can be brought into contact and retained with no displacement.

The internal holder is provided with a plurality of guide grooves in the front ends of the outside upper wall surface and the outside lower wall surface, and the locking projections are formed in the front ends of the inside upper wall surface and the inside lower wall surface of the external housing in such a manner as to be fitted to the guide groove of the internal holder so as to freely engage and disengage. As a result, the internal holder can be accurately and easily assembled in the inner portion of the external housing.

The lock receiving portion is formed in the rear ends of the guide grooves which are formed in the outside upper wall surface and the outside lower wall surface of the internal holder, the lock receiving portion serving as the stopper portion of the internal holder in the pressing direction when fitting the locking projection in the inner portion of the external housing. As a result, it is possible to accurately and easily assemble and fix the internal holder to the inner portion of the external housing at a predetermined position.

The locking projection having the approximately right triangular shape in the side view is formed ahead in the rear portion side of the guide grooves which are formed in the outside upper wall surface and the outside lower wall surface of the internal holder, and the lock receiving portion is formed in the rear surface of the locking projection, the lock receiving portion serving as the stopper of the internal holder in the pulling direction when fitting the locking projection in the inner portion of the external housing. As a result, it is possible to further accurately and easily assemble and fix the internal holder in the inner portion of the external housing at the predetermined position.

BRIEF DESCRIPTION OF DRAWINGS

FIGS. 7A to 7E show a state after assembling the adapter main body of the same mode, in which FIG. 7A is a plan view, FIG. 7B is a side elevational view, FIG. 7C is a bottom elevational view, FIG. 7D is a front elevational view and FIG. 7E is a back elevational view.

FIGS. 8A to 8C show cross sectional state after assembling the adapter main body of the same mode, in which FIG. 8A is a side cross sectional view of the adapter main body corresponding a line A-A of the external housing shown in FIG. 3, FIG. 8B is a side cross sectional view of the adapter main body corresponding to a line B-B of the external housing shown in FIG. 3, and FIG. 8C is a side cross sectional view of the adapter main body corresponding to a line C-C of the external housing shown in FIG. 3.

FIGS. 9A to 9B show a plug insertion sequence, in which FIG. 9A is a cross sectional view during insertion of the plug, and FIG. 9B is a cross sectional view after the insertion of the plug.

FIGS. 12A to 12E show the housing of the MPO type optical adapter according to the conventional example in the same manner, in which FIG. 12A is a plan view, FIG. 12B is a side elevational view, FIG. 12C is a bottom elevational view, FIG. 12D is a front elevational view and FIG. 12E is a back elevational view.

DESCRIPTION OF EMBODIMENT

A description will be in detail given below of an embodiment according to the present invention with reference to the accompanying drawings.

Figure 10:
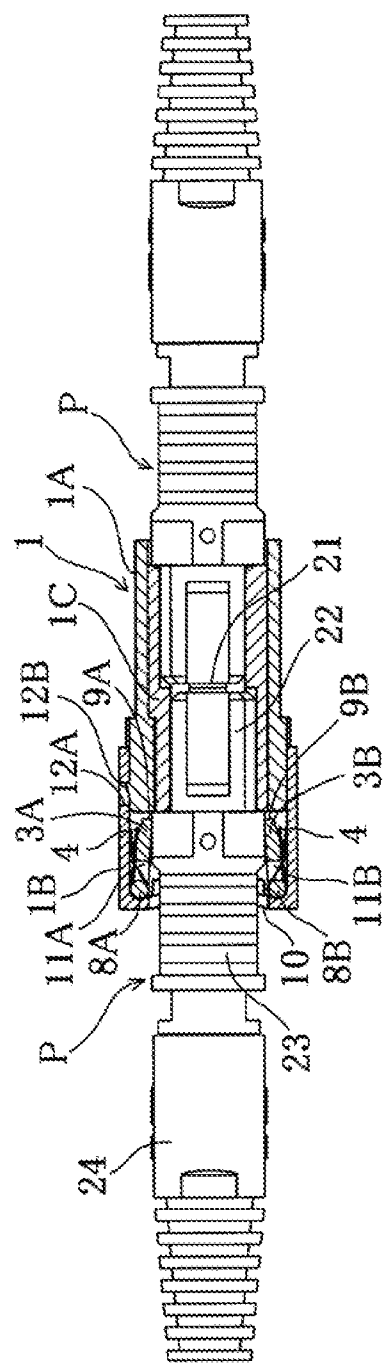
FIG. 10 is a cross sectional view of a state in which optical connector plugs are connected to each other by the adapter main body.
Figure 11:
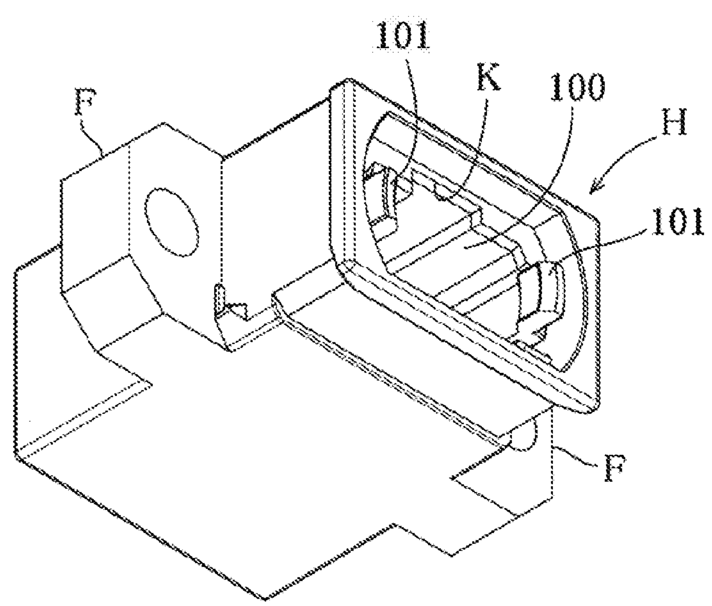
FIG. 11 is a perspective view of a lower surface of a housing of an MPO type optical adapter according to a conventional example.

In the present embodiment, as shown in FIG. 10, there is structured an optical connector with a shutter (hereinafter, abbreviated to an adapter main body 1) for an MPO type optical connector for interconnecting a pair of facing MPO type optical connector plugs P (hereinafter, abbreviated to a plug main body P).

Figure 1:
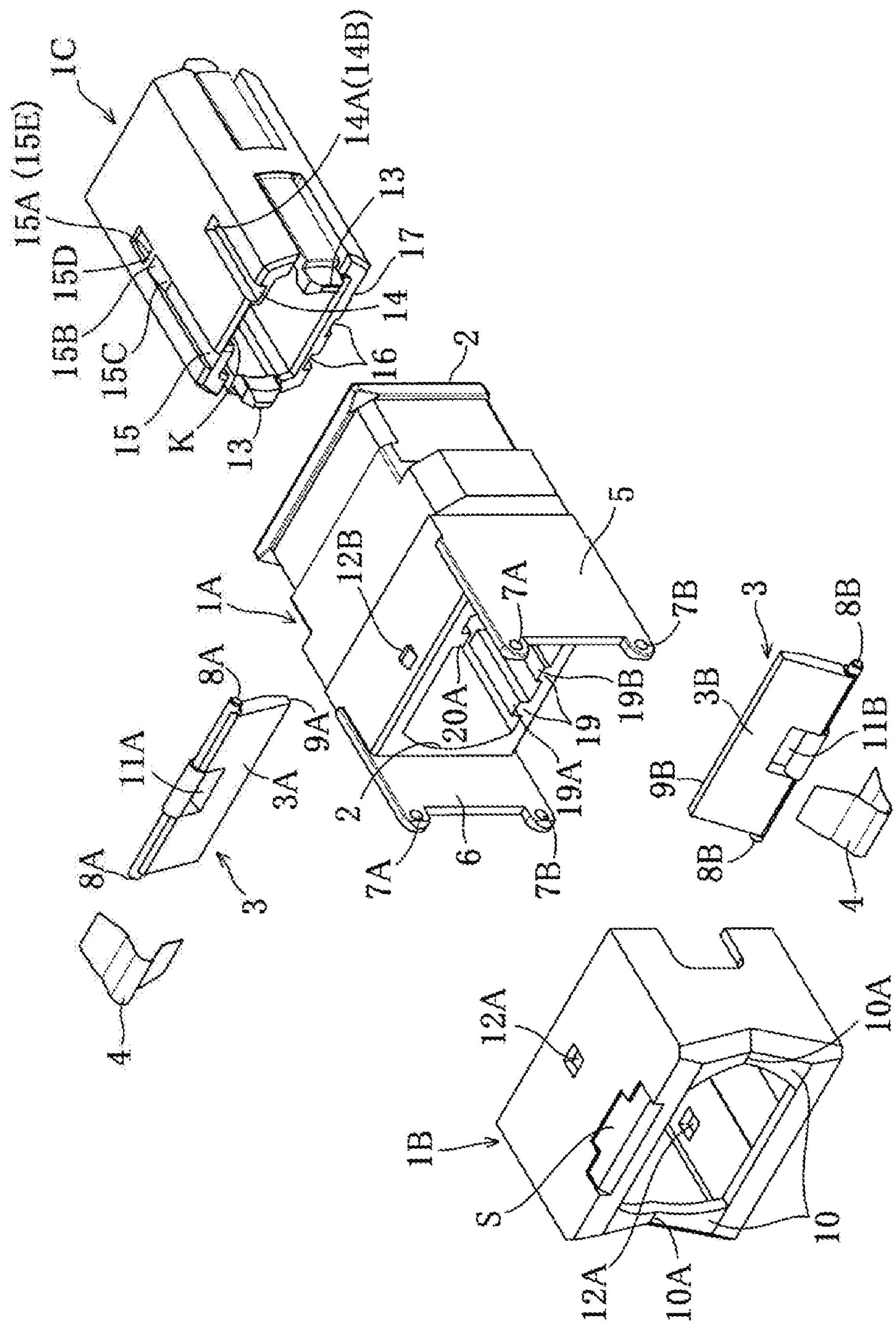
FIG. 1 is an exploded perspective view of an adapter main body and shows a mode for carrying out the present invention.

The adapter main body 1 is approximately constructed by a square tubular external housing 1A which is provided in its front and rear ends with plug insertion ports 2 each of which is formed into a horizontally long rectangular opening shape and inserts a rectangular casing shaped MPO type plug main body P thereto, and is equipped with a shutter 3 for closing a front end of each of the plug insertion port 2 an a freely opening and closing manner, a cover 1B which is outward fitted to the external housing 1A in such a manner as to cover the plug insertion port 2 in the front end side together with the shutter 3 and is formed into a horizontally long rectangular opening shape, and a flat tubular internal holder 1C which is fitted and inserted into an inner portion from the plug insertion port 2 in the rear end side of the external housing 1A, as shown in FIG. 1.

The shutter 3 is constructed by two doors 3A and 3B which are obtained by dividing a plate material into two upper and lower sections so as to be vertically arranged and are formed into a horizontally long rectangular plate shape, the plate material having an area which closes a front end of the horizontally long rectangular opening shaped plug insertion port 2. These two doors 3A and 3B rotate inward respectively when the doors 3A and 3B are pressed by the plug main body P inserted into the plug insertion port 2. At this time, in the present embodiment, these two doors 3A and 3B are formed in such a manner that a radius thereof in a rotating direction is small.

More specifically, the external housing 1A is structured such that left and right side wall portions 5 and 6 are extended forward from the plug insertion port 2 in the front side, and shaft holes 7A and 7B are respectively pierced in both upper and lower ends of a leading end portion in each of the right and left side wall portions 5 and 6. Further, protruding shafts 8A formed in both ends of the upper door 3A in the shutter 3 are pivoted to the upper shaft holes 7A facing each other in the left and right side wall portions 5 and 6, and protruding shafts 8B formed in both ends of the lower door 3B in the shutter 3 are pivoted to the lower shaft holes 7B facing each other in the left and right side wall portions 5 and 6.

Further, the doors 3A and 3B are biased each other in a closing direction by an elastic member 4, for example, a leaf spring. Specifically, as shown in FIGS. 8A to 8C and FIGS. 9A to 9B, rectangular opening portions 11A and 11B are formed approximately at the center where the doors 3A and 3B of the shutter 3 and the protruding shafts 8A and 8B are connected, the elastic member 4 constituted by a leaf spring which is formed by being bent into an approximately L-shaped form and is made of metal is hanged to the opening portions 11A and 11B, and the doors 3A and 3B of the shutter 3 are biased in the closing direction by bringing one end of the elastic member 4 into pressure contact with inner surfaces (rear surfaces) of the doors 3A and 3B of the shutter 3, and bringing the other end thereof into pressure contact with an inner surface of the cover 1B which is outward fitted to the external housing 1A. As a result, the doors 3A and 3B rotate against the biasing force of the elastic member 4 in such a manner as to open like a clamshell structure toward the inner side of the cover 1B when two doors 3A and 3B are pressed by the plug main body P.

A vertical width of each of two upper and lower doors 3A and 3B of the shutter 3 has such a length that door leading ends are bonded inward to each other so as to form an approximately obtuse V-shaped form when the doors rotate each other in the closing direction. A joint state in the approximately obtuse V-shaped form between the doors 3A and 3B corresponds to an approximately obtuse V-shaped form depression portion 10A which is formed in an opening edge portion 10 of the cover 1B mentioned later and locking the doors 3A and 3B. Further, flat surface portions 9A and 9B are formed in the doors 3A and 3B, the flat surface portions 9A and 9B to which the respective leading end portions are surface attached with no clearance when the doors rotate each other in the closing direction.

More specifically, the cover 1B is structured such as to be outward fitted to the external housing 1A so as to cover the shutter 3 and the left and right side wall portions 5 and 6 mentioned above from a forward side, and the opening edge portions 10 forming the depression portions 10A having the approximately obtuse V-shaped form in the front surfaces at the respective centers are formed at the right and left opposing positions of the front opening end of the cover in order to lock two upper and lower doors 3A and 3B rotated each other in the closing direction in an approximately obtuse V-shaped joint state.

An engagement hole portion 12A having a rectangular small hole shape is formed at the center of the upper wall surface and the bilaterally symmetrical positions of the lower wall surface in the cover 1B, and three (one on the upper wall surface and two on the lower wall surface) locking projections 12B having an approximately right triangular shape in the side view are formed at the center of the upper wall surface and the bilaterally symmetrical positions of the lower wall surface in the external housing 1A in correspondence to the engagement hole portions 12A. When the cover 1B is outward fitted to the external housing 1A, each of the locking projections 12B is engaged with each of the engagement hole portions 12A.

In the internal holder 1C, a locking arm 13 freely bending in a mutually expanding direction is provided at the bilaterally symmetrical positions in the front and rear opening sides in a state in which each of leading ends protrudes, in order to retain both the plug main bodies P (the ferrule which is not shown) at the fitting position where the optical reference planes of the plug main bodies P respectively inserted from both end sides are conformed to each other.

Further, the internal holder 1C is fitted and inserted to the inner portion from the rear end side of the plug insertion port 2 in the external housing 1A while setting its direction. More specifically, as shown in FIG. 1, two short guide deep bottom groove 14 and long guide shallow bottom groove 15 are formed side by side in both sides of the upper wall surface of the internal holder 1C.

A lock receiving portion 14A is formed in a rear end of the short guide deep bottom groove 14 toward a front side of the internal holder 1C.

In the meanwhile, a lock receiving portion 15A serving as a stopper is formed in a side which is somewhat closer to a front portion side from a rear end of the long guide shallow bottom groove 15 toward a rear side of the internal holder 1C, that is, facing the lock receiving portion 14A in a reverse direction.

The lock receiving portion 14A is formed in a vertical wall surface portion 14B which is provided in the rear end of the guide deep bottom groove 14, and the lock receiving portion 15A is formed in a rear surface of a locking projection 15B which is provided in a side which is somewhat closer to a front portion side from the rear end of the guide shallow bottom groove 15.

More specifically, the locking projection 15B is formed into an approximately right triangular shape in a side view, and is provided with a taper surface 15C in a front portion, a horizontal top surface portion 15D in a center portion and a vertical wall surface portion 15E in a rear portion, and the vertical wall surface portion 15E serves as the lock receiving portion 15A (the stopper).

Figure 2:
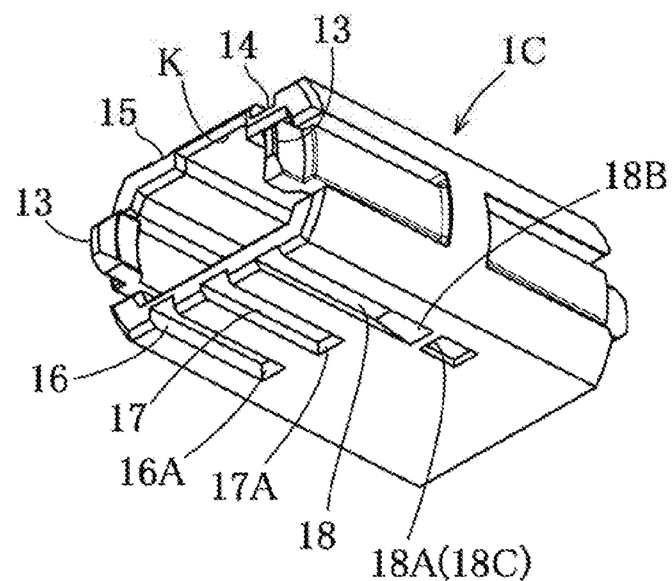
FIG. 2 is a perspective view of a bottom surface of an internal housing in the adapter main body of the same mode.

Further, as shown in FIG. 2, short guide deep bottom groove 16 and guide intermediate bottom groove 17 and a long guide shallow bottom groove 18, totally three grooves are formed in a lower wall surface of the internal holder 1C side by side at the uniform intervals in such a manner as to be open to the front end of the internal holder 1C.

Further, lock receiving portions 16A and 17A having the same aspects and the same functions as those of the guide deep bottom groove 14 and the guide shallow bottom groove 15 in the upper wall side are respectively formed in the rear ends of the guide deep bottom groove 16 and the guide intermediate bottom groove 17 which are short in length. In the meanwhile, a lock receiving portion 18A having the same aspect and the same function as those of the guide shallow bottom groove 15 in the upper wall side is formed in a side which is somewhat closer to a front portion side from a rear end of the long guide shallow bottom groove 18.

More specifically, a locking projection 18B is provided in a rear side of the guide shallow bottom groove 18, the locking projection 18B having an approximately right triangular shape in the same manner as the locking projection 15B in the upper wall side, and a rear vertical wall surface portion 18C of the locking projection 18B forms the lock receiving portion 18A.

Figure 4:
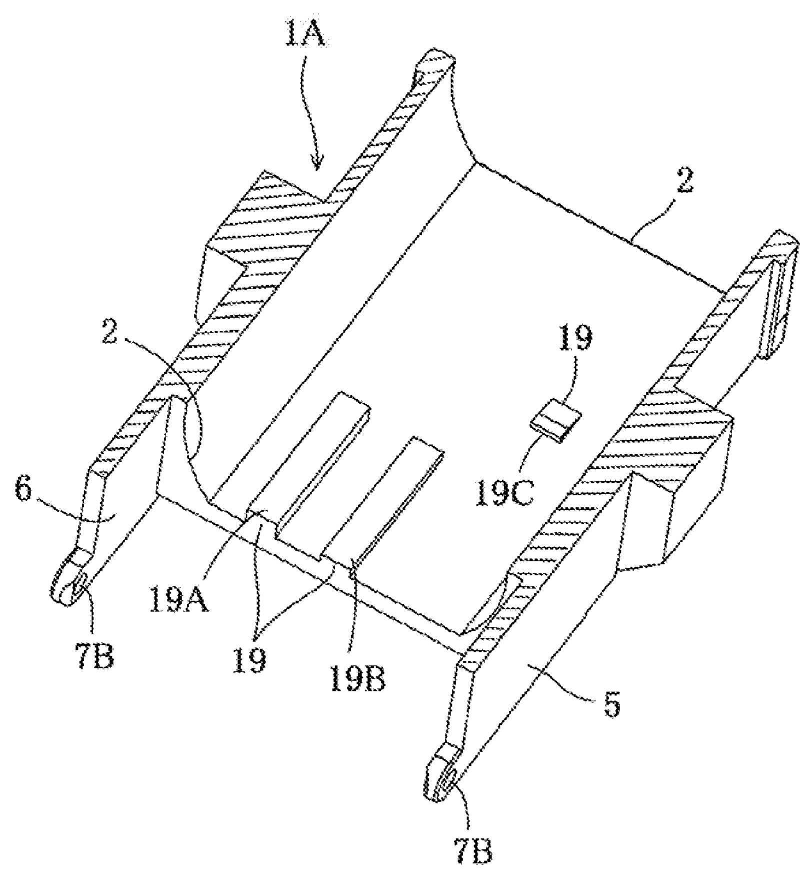
FIG. 4 is a perspective view of a horizontal half cross section of the external housing in the adapter main body of the same mode.
Figure 5:
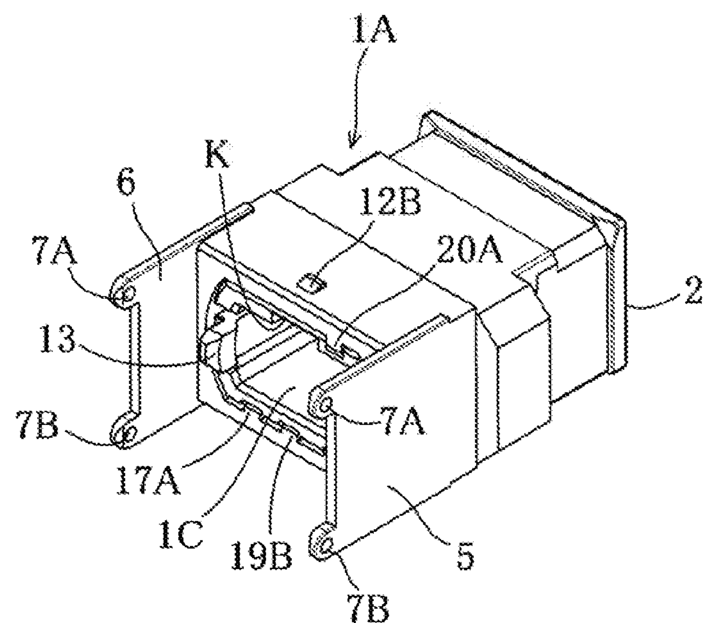
FIG. 5 is a perspective view showing a state in which an internal holder is assembled in the external housing in the adapter main body of the same mode.
Figure 6:
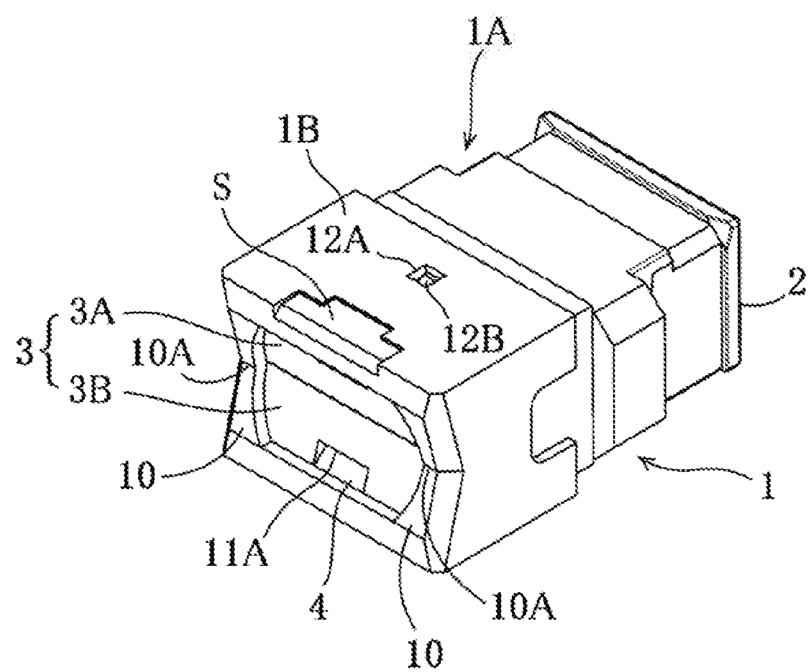
FIG. 6 is a perspective view showing a state after assembling the adapter main body of the same mode.
Figures 7A, 7B, 7C, 7D, 7E:
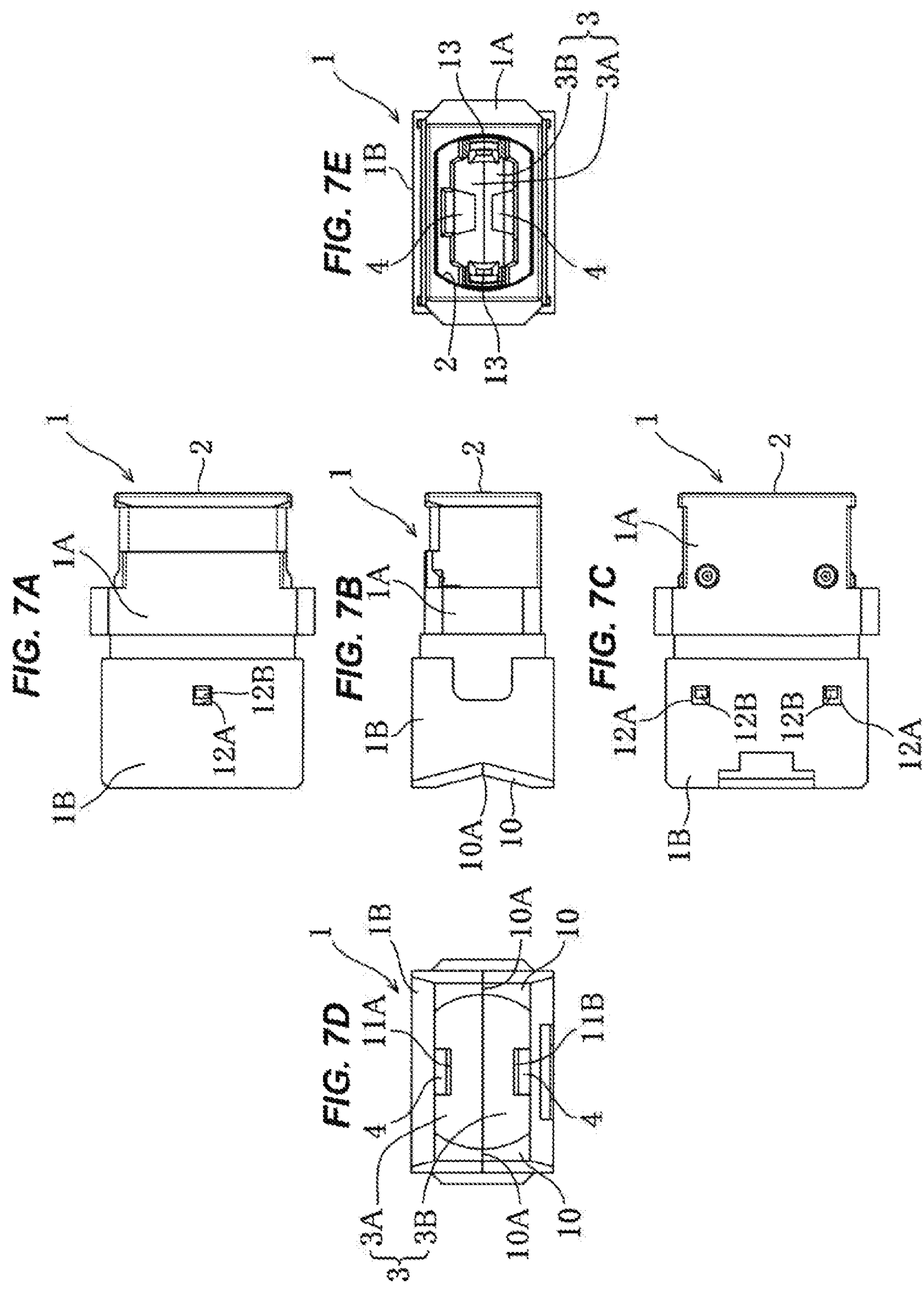
Figure 8A:
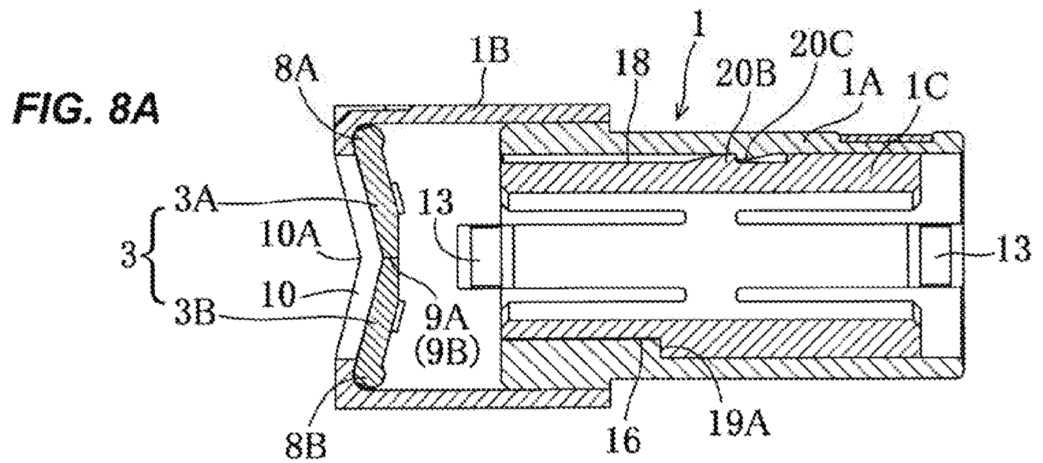
Figure 8B:
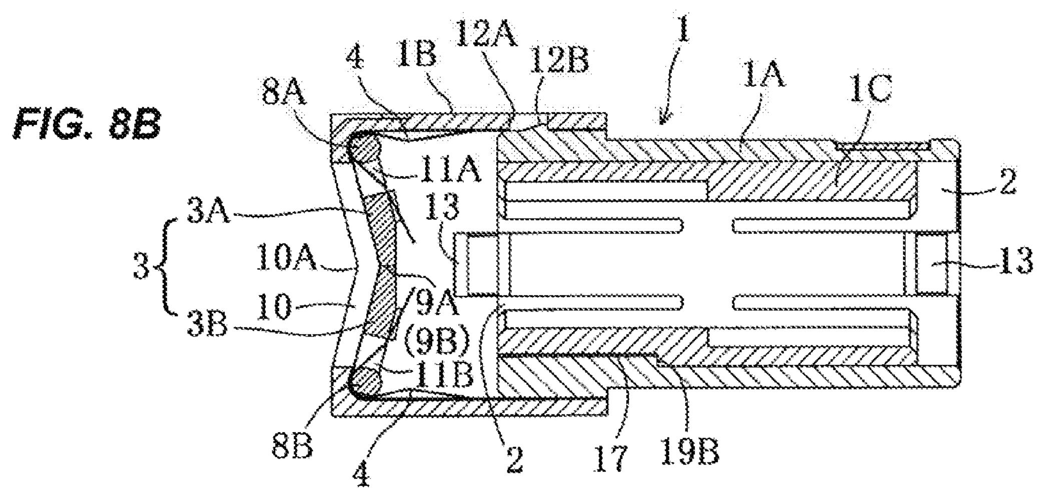
Figure 8C:
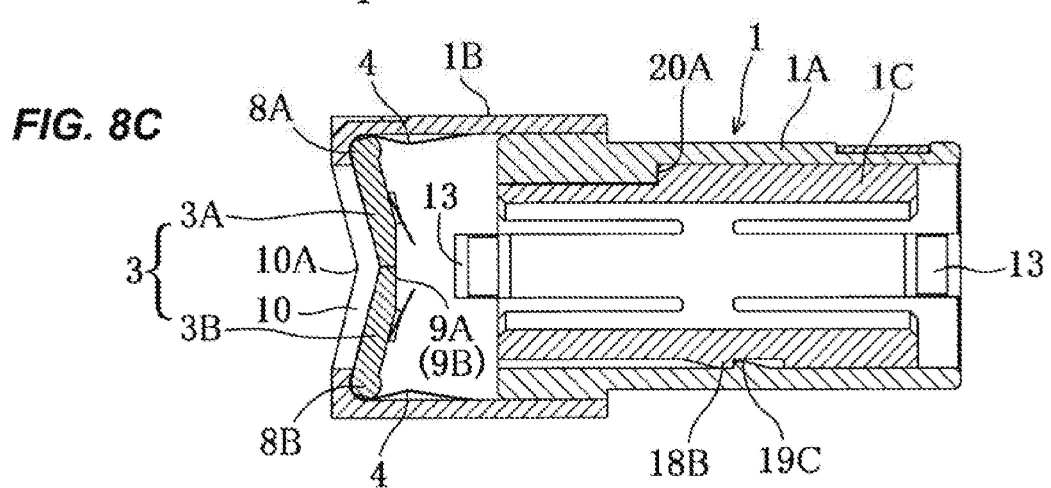

Further, as shown in FIG. 4, three locking projections 19 are formed in a front portion of a lower wall in the inner portion of the external housing 1A side by side at the same intervals, the locking projections 19 being slidably fitted to the short guide deep bottom groove 16 and guide intermediate bottom groove 17 and the guide shallow bottom groove 18 which are provided in the lower wall surface of the internal holder 1C and having different heights.

More specifically, the locking projections 19 are formed as rectangular parallelepiped shapes having the same height and the same length in such a manner that locking projections 19A and 19B in sides fitting to the guide deep bottom groove 16 and the guide intermediate bottom groove 17 which are provided in the lower wall surface of the internal holder 1C and are short are adapted to the grooves 16 and 17 in the front side of the lower wall portion within the external housing 1A. In the meanwhile, a locking projection 19C in a side fitting to the long guide shallow bottom groove 18 is formed into an approximately right triangular shape in a side view in such a manner that a rear vertical surface 19D is locked to the lock receiving portion 18A at the center of the lower wall portion within the external housing 1A.

As mentioned above, the rectangular parallelepiped locking projections 19A and 19B of the external housing 1A are locked to the respective lock receiving portions 16A and 17A of the short guide deep bottom groove 16 and guide intermediate bottom groove 17 in the internal holder 1C when fitting the internal holder 1C. More specifically, the rear ends of the locking projections 19A and 19B serve as a stopper portion of the internal holder 1C in a pressing direction.

Further, the locking projection 19C having the approximately right triangular shape in the side view of the external housing 1A is locked to the lock receiving portion 18A which is provided in the rear side of the long guide shallow bottom groove 18 in the internal holder 1C when fitting the internal holder 1C. More specifically, the lock receiving portion 18A to which the locking projection 19C is locked serves as a stopper portion of the internal holder 1C in a pulling direction.

Further, as shown in FIG. 4, two locking projections 20 are formed in the upper wall portion in the inner portion of the external housing 1A while leaving a space therebetween, the locking projections 20 being slidably fitted to the short guide deep bottom groove 14 and the long guide shallow bottom groove 15 which are provided in the upper wall surface of the internal holder 1C and having different heights.

More specifically, the locking projection 20 is formed into a rectangular parallelepiped shape having the same height and the same length as those of the groove 14 in such a manner that a locking projection 20A in a side fitting to the short guide deep bottom groove 14 in the internal holder 1C is adapted to the groove 14 in the front side of the lower wall portion within the external housing 1A. The locking projection 20A is formed into the same shape and same size as those of the locking projection 19A which is provided in the lower wall portion within the external housing 1A.

Further, the locking projection 20A is locked to the lock receiving portion 14A provided in the rear side of the guide deep bottom groove 14 of the internal holder 1C when the internal holder 10 is fitted to the external housing 1A. More specifically, the lock receiving portion 14A to which the locking projection 20A is locked serves as the stopper of the internal holder 1C in the pressing direction.

In the meanwhile, the locking projection 20 is formed into an approximately right triangular shape in a side view in such a manner that a locking projection 20B in a side fitting to the long guide shallow bottom groove 15 of the internal holder 1C is locked to the lock receiving portion 15A in a rear vertical surface 200 at the center of the upper wall portion within the external housing 1A.

The locking projection 20B having the approximately right triangular shape in the side view of the external housing 1A is also structured, in the same manner as the locking projection 190, such that lock receiving portion 15A to which the locking projection 20B is locked serves as the stopper of the internal holder 1C in the pulling direction.

Figure 3:
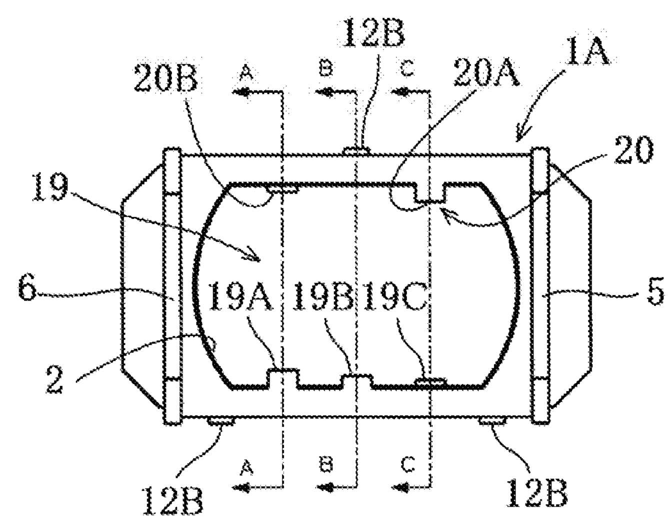
FIG. 3 is a front elevational view of an external housing in the adapter main body of the same mode.

Reference symbol S in FIGS. 1 and 4 is a mark for making out a key direction of the internal holder 1C, and reference symbol K in FIGS. 1 and 3 denotes a key groove for inserting an optical connector plug (not shown) while setting a vertical direction.

Figure 9A:
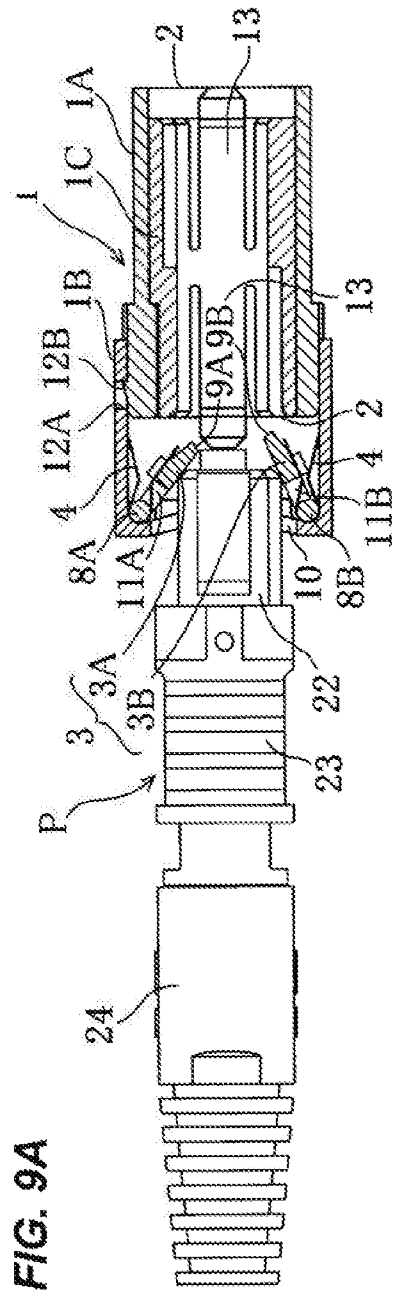
Figure 9B:
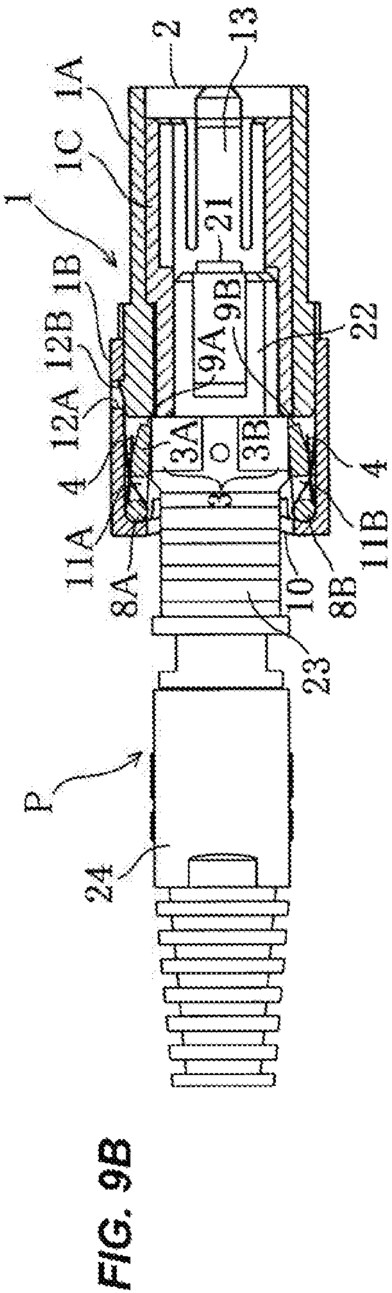

A well-known plug main body P according to the present embodiment substantially has a ferrule 21 which is attached to a leading end of an optical fiber tape core wire, a sleeve-shaped housing 22 which accommodates the ferrule 21 in its leading end, an internal sleeve which is installed to an outer periphery of the housing 22 and is not illustrated, a tubular coupling 23 which is outward inserted to the internal sleeve and is provided slidably in a movable range secured in an axial direction of the housing 22, a spring which is housed in an inner portion of the housing 22, elastically biases the ferrule 21 forward and is not illustrated, and a boot 24 which is attached to a an opposite rear end portion to a front end provided with the ferrule 21 in the housing 22, as shown in FIGS. 9A, 9B and 10.

Next, a description will be given of an example of a use and a motion of the embodiment structured as mentioned above with reference to FIGS. 9A, 9B and 10.

As shown in FIG. 9A, in the plug insertion port 2, the upper and lower two doors 3A and 3B of the shatter 3 are biased by the elastic member 4 in the closing direction and closed before the plug main body P is inserted into the adapter main body 1. At this time, the upper and lower two doors 3A and 3B rotating each other in the closing direction are locked in an approximately obtuse V-shaped joint state by the opening edge portion 10 forming the approximately obtuse V-shaped depression portion 10A, and the flat surface portions 9A and 9B in the respective leading end portions of the upper and lower two doors 3A and 3B are retained in a contact manner while forming a surface close contact state with no clearance.

Next, when the plug main body P is inserted into the adapter main body 1 as shown in FIG. 9A, two doors 3A and 3B are pressed by the plug main body P, and the doors 3A and 3B rotate inward against the biasing force of the elastic member 4 in such a manner as to form a laterally clamshell structure toward the inner side of the cover 1B.

Further, when the plug main body P is further pressed and is going to be inserted into the plug insertion port 2 of the external housing 1A as shown in FIG. 9B, the locking arms 13 of the internal holder 1C fitted and inserted to the inner side of the external housing 1A bend in the mutually expanding direction and the leading ends of the locking arms 13 are hanged and retained to engagement portions which are formed in right and left wall surfaces of the plug main body P (the not-illustrated ferrule) and are not shown.

In the meanwhile, when the other plug main body P is inserted into the other end opening side of the internal holder 1C (the other plug insertion port 2 of the external housing 1A) as shown in FIG. 10, the locking arms 13 of the internal holder 1C bend in the mutually expanding direction in the same manner as mentioned above, and the leading ends of the locking arms 13 are hanged and retained to the engagement portions which are formed in the right and left walls of the plug main body P and are not illustrated. The optical reference planes of the plug main bodies P inserted into the front and rear plug insertion ports 2 of the external housing 1A are retained in a state in which they are brought into line with each other.

REFERENCE SIGN LIST

P: plug main body
F: flange

K: key groove
S: mark
1: adapter main body
1A: external housing
1B: cover
1C: internal holder
2: plug insertion port
3: shutter
3A: upper door
3B: lower door
4: elastic member
5: right wall portion
6: left wall portion
7A, 7B: shaft hole
BA, 8B: protruding shaft
9A, 9B: flat surface portion
10: opening edge portion
10A: depression portion
11A, 11B: opening portion
12A: engagement hole portion
12B: locking projection
13: locking arm
14: guide deep bottom groove
14A: lock receiving portion
14B: wall surface portion
15: guide shallow bottom groove
15A: lock receiving portion
15B: locking projection
15C: taper surface
15D: horizontal top surface portion
15E: vertical wall surface portion
16: guide deep bottom groove
16A: lock receiving portion
17: guide intermediate bottom groove
17A: lock receiving portion
18: guide shallow bottom groove
18A: lock receiving portion
18B: locking projection
18C: vertical wall surface portion
19: locking projection
19A, 19B: locking projection
19C: locking projection
19C: rear vertical surface
20: locking projection
20A: locking projection
20B: locking projection
20C: rear vertical surface
21: ferrule
22: housing
23: coupling
24: boot
100: plug insertion port
101: arm-shaped locking piece

The invention claimed is:

1. An optical adapter comprising:

an adapter main body having a plug insertion port into which an optical connector plug is inserted;

a shutter for closing the plug insertion port; and the shutter being installed in the adapter main body so as to freely open and close, and being biased in a closing direction by an elastic member, wherein the shutter is constructed by two doors which are separated into two upper and lower sections and vertically arranged in such a manner that the doors respectively rotate inside when the shutter is pushed by the optical connector plug inserted into the plug insertion port, the adapter main body is provided with an external housing in which right and left side wall portions are extended forward from the plug insertion port and a shaft hole is formed in each of both upper and lower ends in each of leading end portions of the right and left side wall portions, protruding shafts formed in both ends of the upper door of the shutter are pivoted to the upper shaft holes facing each other of the right and left side wall portions, and the protruding shafts formed in both the right and left ends of the lower doors of the shutter are pivoted to the lower shaft holes facing each other in the right and left side wall portions;

wherein the upper and lower two doors of the shutter have a vertical width in which door leading ends are bonded inward to form an approximately obtuse V-shaped form when the doors rotate in a closing direction, and have in the respective leading end portions flat surface portions which are closely attached with surfaces.

2. The optical adapter according to claim 1, wherein the adapter main body is provided with a cover which is outward fitted to the external housing in such a manner as to cover the shutter and the right and left side wall portions from a forward side, has at right and left facing positions in a front side opening end of the cover opening edge portions for locking the upper and lower two doors rotating each other in the closing direction, and forms a depression portion having an approximately obtuse V-shaped form at the center of each of the opening edge portions.

3. The optical adapter according to claim 2, wherein the cover is structured such that engagement hole portions are respectively formed in an upper wall surface and a lower wall surface thereof, locking projections are respectively formed in an upper wall surface and a lower wall surface of the external housing in correspondence to the engagement hole portions, and the respective locking projections are engaged with the respective engagement hole portions when the cover is outward fitted to the external housing.

4. The optical adapter according to claim 1, wherein the external housing is provided with an internal holder which is fitted and inserted from a rear end side of the plug insertion port, and is formed so as to conform optical reference planes of the plug main bodies respectively inserted from both end sides of the internal holder to each other.

5. The optical adapter according to claim 4, wherein the internal holder is provided with a plurality of guide grooves in front ends of an outside upper wall surface and an outside lower wall surface, and locking projections are formed in front ends of an inside upper wall surface and an inside lower wall surface of the external housing in such a manner as to be fitted to a guide groove of the internal holder so as to freely engage and disengage.

6. The optical adapter according to claim 5, wherein a lock receiving portion is formed in rear ends of guide grooves which are formed in an outside upper wall surface and an outside lower wall surface of the internal holder, the lock receiving portion serving as a stopper portion of the internal holder in a pressing direction when fitting the locking projection in the inner portion of the external housing.

7. The optical adapter according to claim 5, wherein a locking projection having an approximately right triangular shape in a side view is formed ahead in a rear portion side of guide grooves which are formed in the outside upper wall surface and the outside lower wall surface of the internal holder, and a lock receiving portion is formed in a rear surface of the locking projection, the lock receiving portion serving as a stopper of the internal holder in a pulling direction when fitting the locking projection in the inner portion of the external housing.

8. The optical adapter according to claim 4, wherein a lock receiving portion is formed in rear ends of guide grooves which are formed in an outside upper wall surface and an outside lower wall surface of the internal holder, the lock receiving portion serving as a stopper portion of the internal holder in a pressing direction when fitting the locking projection in the inner portion of the external housing.

9. An optical adapter, comprising:

an adapter main body having a plug insertion port into which an optical connector plug is inserted;

a shutter for closing the plug insertion port; and the shutter being installed in the adapter main body so as to freely open and close, and being biased in a closing direction by an elastic member, wherein the shutter is constructed by two doors which are separated into two upper and lower sections and vertically arranged in such a manner that the doors respectively rotate inside when the shutter is pushed by the optical connector plug inserted into the plug insertion port, the adapter main body is provided with an external housing in which right and left side wall portions are extended forward from the plug insertion port and a shaft hole is formed in each of both upper and lower ends in each of leading end portions of the right and left side wall portions, protruding shafts formed in both ends of the upper door of the shutter are pivoted to the upper shaft holes facing each other of the right and left side wall portions, and the protruding shafts formed in both the right and left ends of the lower doors of the shutter are pivoted to the lower shaft holes facing each other in the right and left side wall portions;

wherein the adapter main body is provided with a cover which is outward fitted to the external housing in such a manner as to cover the shutter and the right and left side wall portions from a forward side, has at right and left facing positions in a front side opening end of the cover opening edge portions for locking the upper and lower two doors rotating each other in the closing direction, and forms a depression portion having an approximately obtuse V-shaped form at the center of each of the opening edge portions.

10. The optical adapter according to claim 9, wherein the cover is structured such that engagement hole portions are respectively formed in an upper wall surface and a lower wall surface thereof, locking projections are respectively formed in an upper wall surface and a lower wall surface of the external housing in correspondence to the engagement hole portions, and the respective locking projections are engaged with the respective engagement hole portions when the cover is outward fitted to the external housing.

11. The optical adapter according to claim 9, wherein the external housing is provided with an internal holder which is fitted and inserted from a rear end side of the plug insertion port, and is formed so as to conform optical reference planes of the plug main bodies respectively inserted from both end sides of the internal holder to each other.

12. The optical adapter according to claim 11, wherein the internal holder is provided with a plurality of guide grooves in front ends of an outside upper wall surface and an outside lower wall surface, and locking projections are formed in front ends of an inside upper wall surface and an inside lower wall surface of the external housing in such a manner as to be fitted to a guide groove of the internal holder so as to freely engage and disengage.

13. The optical adapter according to claim 12, wherein a lock receiving portion is formed in rear ends of guide grooves which are formed in an outside upper wall surface and an outside lower wall surface of the internal holder, the lock receiving portion serving as a stopper portion of the internal holder in a pressing direction when fitting the locking projection in the inner portion of the external housing.

14. The optical adapter according to claim 12, wherein a locking projection having an approximately right triangular shape in a side view is formed ahead in a rear portion side of guide grooves which are formed in the outside upper wall surface and the outside lower wall surface of the internal holder, and a lock receiving portion is formed in a rear surface of the locking projection, the lock receiving portion serving as a stopper of the internal holder in a pulling direction when fitting the locking projection in the inner portion of the external housing.

15. An optical adapter, comprising:

an adapter main body having a plug insertion port into which an optical connector plug is inserted;

a shutter for closing the plug insertion port; and the shutter being installed in the adapter main body so as to freely open and close, and being biased in a closing direction by an elastic member, wherein the shutter is constructed by two doors which are separated into two upper and lower sections and vertically arranged in such a manner that the doors respectively rotate inside when the shutter is pushed by the optical connector plug inserted into the plug insertion port, the adapter main body is provided with an external housing in which right and left side wall portions are extended forward from the plug insertion port and a shaft hole is formed in each of both upper and lower ends in each of leading end portions of the right and left side wall portions, protruding shafts formed in both ends of the upper door of the shutter are pivoted to the upper shaft holes facing each other of the right and left side wall portions, and the protruding shafts formed in both the right and left ends of the lower doors of the shutter are pivoted to the lower shaft holes facing each other in the right and left side wall portions;

wherein the external housing is provided with an internal holder which is fitted and inserted from a rear end side of the plug insertion port, and is formed so as to conform optical reference planes of the plug main bodies respectively inserted from both end sides of the internal holder to each other; and wherein a locking projection having an approximately right triangular shape in a side view is formed ahead in a rear portion side of guide grooves which are formed in the outside upper wall surface and the outside lower wall surface of the internal holder, and a lock receiving portion is formed in a rear surface of the locking projection, the lock receiving portion serving as a stopper of the internal holder in a pulling direction when fitting the locking projection in the inner portion of the external housing.

* * * * *